(12) United States Patent
Kokeguchi

(10) Patent No.: US 7,398,995 B2
(45) Date of Patent: Jul. 15, 2008

(54) AIR BELT

(75) Inventor: Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 110 days.

(21) Appl. No.: 11/395,335

(22) Filed: Apr. 3, 2006

(65) Prior Publication Data

US 2006/0237954 A1    Oct. 26, 2006

Related U.S. Application Data

(60) Provisional application No. 60/667,767, filed on Apr. 4, 2005.

(51) Int. Cl.
*B60R 21/18* (2006.01)

(52) U.S. Cl. .................. 280/733; 280/730.1; 280/743.1; 280/801.1

(58) Field of Classification Search ................. 280/733, 280/730.1, 743.1, 801.1
See application file for complete search history.

(56) References Cited

U.S. PATENT DOCUMENTS

| | | | |
|---|---|---|---|
| 5,393,091 A | 2/1995 | Tanaka et al. | |
| 5,466,003 A | 11/1995 | Tanaka et al. | |
| 6,189,921 B1 * | 2/2001 | Takeuchi | 280/733 |
| 6,217,063 B1 * | 4/2001 | Takeuchi | 280/733 |
| 6,244,621 B1 | 6/2001 | Kameyoshi et al. | |
| 6,336,656 B1 * | 1/2002 | Romeo | 280/733 |
| 6,419,263 B1 * | 7/2002 | Busgen et al. | 280/733 |
| 6,439,601 B1 | 8/2002 | Iseki | |
| 6,575,201 B2 | 6/2003 | Buesgen | |
| 6,648,369 B2 * | 11/2003 | Mishima et al. | 280/733 |
| 6,692,020 B2 * | 2/2004 | Decomps et al. | 280/733 |
| 6,698,790 B2 * | 3/2004 | Iseki et al. | 280/733 |
| 6,705,641 B2 * | 3/2004 | Schneider et al. | 280/733 |
| 6,837,079 B1 * | 1/2005 | Takeuchi | 66/198 |
| 7,121,628 B2 * | 10/2006 | Lo | 297/482 |
| 7,237,799 B2 * | 7/2007 | Clute | 280/733 |
| 2001/0045731 A1 | 11/2001 | Iseki | |
| 2002/0125701 A1 * | 9/2002 | Devonport | 280/733 |
| 2002/0125702 A1 * | 9/2002 | Ohhashi | 280/733 |

FOREIGN PATENT DOCUMENTS

| | | |
|---|---|---|
| EP | 0 901 945 A2 | 3/1999 |
| GB | 2 341 358 | 3/2000 |
| JP | 6-64493 | 3/1994 |
| JP | 10-226295 | 8/1998 |
| JP | 2001-239906 | 9/2001 |
| JP | 2002-527282 | 8/2002 |
| JP | 2003-312439 | 11/2003 |
| WO | WO 98/51542 | 11/1998 |

\* cited by examiner

*Primary Examiner*—Toan C To
(74) *Attorney, Agent, or Firm*—Foley & Lardner LLP

(57) ABSTRACT

An air belt device includes a first cover member and a second cover member connected to each other defining an interior surface having an interior cavity. An inflatable member is at least partially disposed within the interior cavity. The inflatable member is folded with sewn edge portions folded inward.

13 Claims, 4 Drawing Sheets

PRIOR ART

PRIOR ART

AIR BELT

This application claims priority to and the benefit of U.S. Provisional Application No. 60/667,767, filed Apr. 4, 2005, the entire contents of which are incorporated herein by reference.

BACKGROUND

Embodiments of the present invention relate generally to safety devices and systems and in particular, embodiments of the present invention relate to an air belt device including an inflatable member folded and stored in a manner to provide maximum comfort and protection to an occupant, and an air belt apparatus employing the same.

A conventional air belt apparatus is described in Japanese Patent Unexamined Publication No. H05-85301. FIG. 1 is a perspective view of an air belt apparatus according the publication.

As shown in FIG. 1, the air belt apparatus 1 includes a shoulder belt 2 diagonally extending from the right side of an occupant to the left side of the occupant, a lap belt 3 extending from the right side of the occupant to the left side of the occupant, a buckle device 4 disposed on, for example, a vehicle floor, a tongue 5 to be inserted into and engaged with the buckle device 4 when the occupant wears the shoulder belt 2, and a through-anchor 6 for guiding the shoulder belt 2.

The shoulder belt 2 includes a webbing 2a which is similar to a conventional and general seat belt and an air belt 2b connected to an end of the webbing 2a. The webbing 2a is slidably guided and hung-through by the through-anchor 6. The other end of the webbing 2a is connected to a seat belt retractor 7 with an emergency locking mechanism (ELR) which is fixed to the vehicle body. The webbing 2a is arranged in such a manner as to be wound into the seat belt retractor 7.

The upper end of the air belt 2b is connected to the webbing 2a by sewing or some other form of attachment and the lower end of the air belt 2b is connected to the tongue 5 for connection to the buckle device 4. The air belt 2b is positioned to be in contact with the occupant.

The lap belt 3 includes a normal belt which is the same as a typical conventional seat belt, of which one end is connected to the tongue 5 and the other end is connected to a seat belt retractor 8 with an emergency locking mechanism (ELR) which is fixed to the vehicle body. A gas generator 9 is connected to the buckle device 4 for generating high-pressure gas when required in an emergency situation such as a vehicle collision.

The tongue 5 and the buckle device 4 are provided with paths for introducing gas from the gas generator 9 to the air belt 2b.

The air belt 2b includes a large-width belt-like bag (e.g., an inflatable member) which is folded into a small-width belt-shape and is covered with a cover. The air belt 2b retains its belt-shape under normal conditions. The air belt apparatus 1 is used in a manner similar to that of a general seatbelt. When the gas generator 9 is operated upon a vehicle collision, the air belt 2b is inflated, as is shown by the dashed lines in FIG. 1, so as to protect the occupant.

In the conventional air belt apparatus 1 described above, the separate webbing 2a is required to be connected to the air belt 2b and wound around the retractor 7, because the thickness of the air belt 2b is larger than that of the webbing 2a. This causes wrinkles to be formed on the contact surface with the through-anchor 6 and the air belt 2b. As a result, the air belt 2b is difficult to be passed through the through-anchor 6 and also difficult to be wound around the retractor 7. An added problem which makes the air belt 2b so difficult to pass through the through-anchor 6 and causes the air belt 2b to have a bumpy surface is the manner in which a inflatable member is folded and stored.

FIG. 2(a) is a plan view showing a portion around a joint between the webbing 2a and the air belt 2b. FIG. 2(b) is a plan view of the inflatable member, and FIGS. 2(c), (d) and (e) are sectional views taken along lines C-C, D-D, and E-E in FIG. 2(a), respectively.

As shown in FIGS. 2(a), (c), (d) and (e) the air belt 2b includes the inflatable member 100 and a knit cover 120 made of woven fabric and surrounding the inflatable member 100. The inflatable member 100 is formed in such a configuration that a portion confronting the chest and abdomen of an occupant in a seat has a larger area. The portion with larger area is folded to be in a band-like configuration as shown in FIGS. 2(b), 2(c) and 2(d).

As illustrated in FIGS. 2(c) and (d), the inflatable member 100 is folded in such a manner that the edges of the sewn portions face outward toward the knit cover 120. These outward peripheral sewn portions are unsightly as they make the air belt 2b appear bumpy and also hamper the air belt 2b from passing through the through-anchor 6. Further, the length of the overall air belt 2b is increased by having the edges of the sewn portions folded outward.

Therefore, it is desired to have an air belt device such that the smoothness to the touch of the air belt is improved, the overall length of the air belt is shortened and the air belt can pass through the through-anchor easily.

SUMMARY

Various disclosed embodiments address the problems described above and relate to an air belt device having an inflatable member folded and stored in a manner that the air belt device is smooth, the length is reduced and it can pass through a through anchor easily. The air belt device includes a first cover member and a second cover member connected to each other defining an interior surface having an interior cavity. An inflatable member is at least partially disposed within the interior cavity defined by the first cover member in a non-inflated state. The inflatable member is folded with sewn edge portions folded inward.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DESCRIPTION

Figure 1:
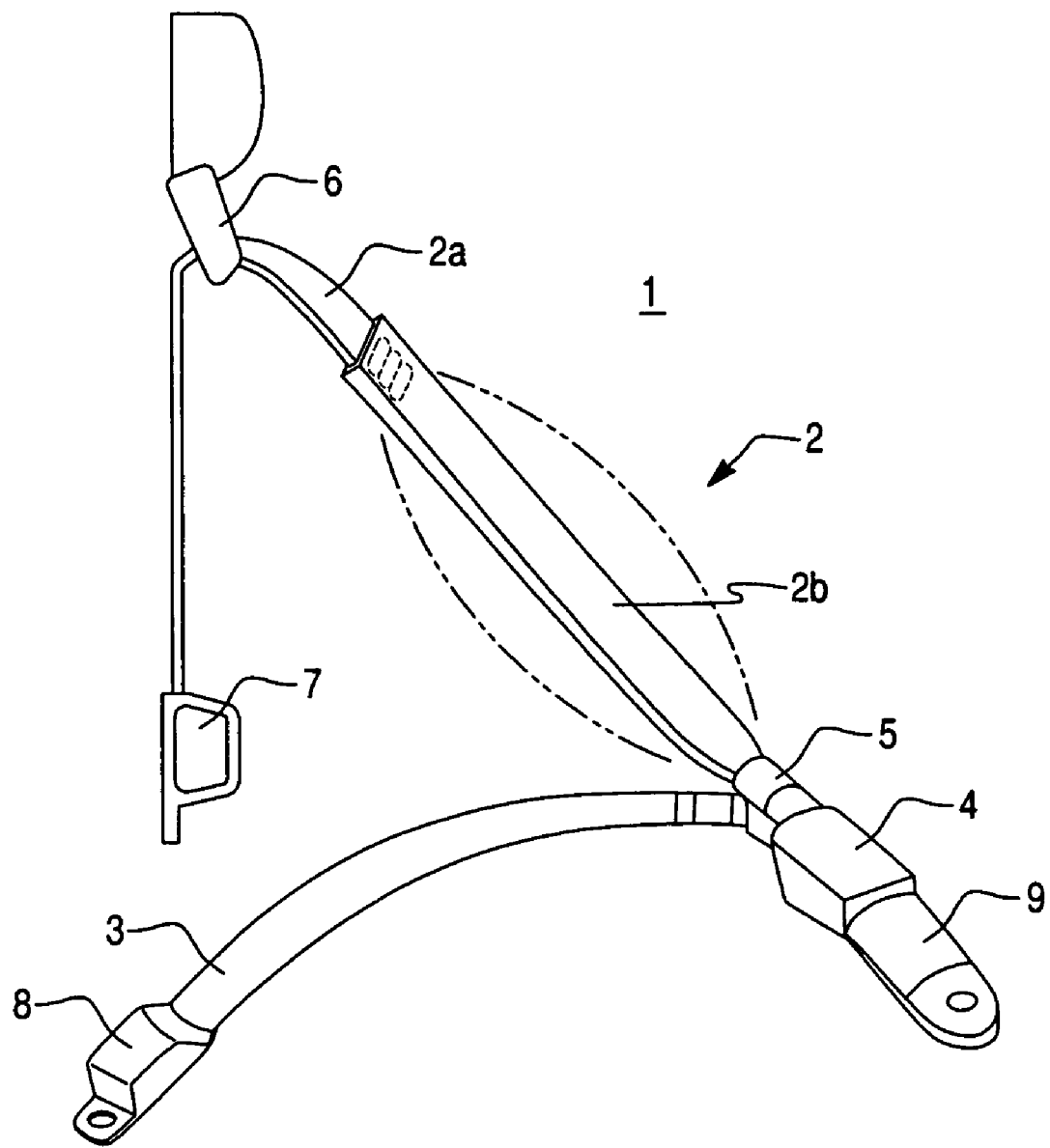
FIG. 1 is a structural representation of a conventional air belt apparatus.
Figure 2A:
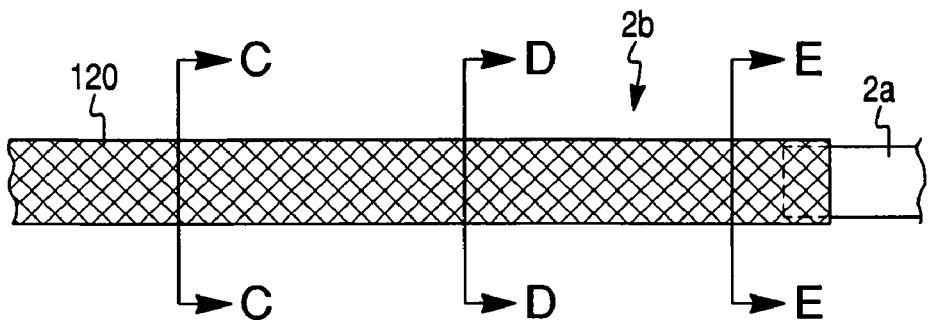
FIGS. 2(a)-2(e) are structural views of a conventional shoulder belt.
Figure 2B:
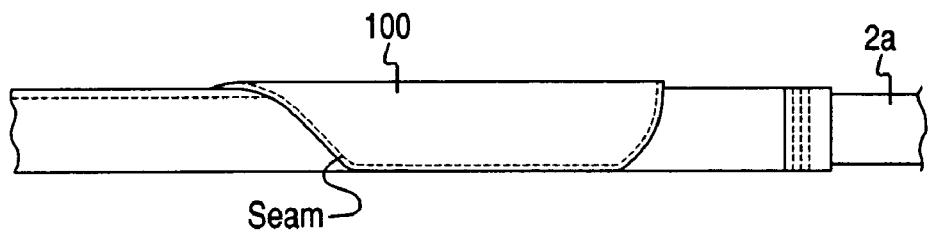
Figure 2C:
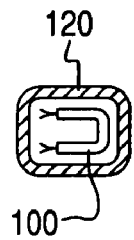
Figure 2D:
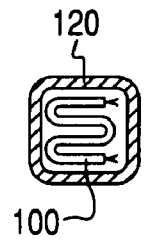
Figure 2E:
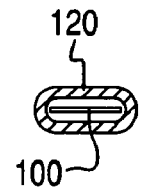

Exemplary embodiments according to the present invention will be discussed below with reference to the drawing figures. In the figures, where possible, like reference numerals are utilized to designate like components through the views of various disclosed exemplary embodiments.

Figure 3A:
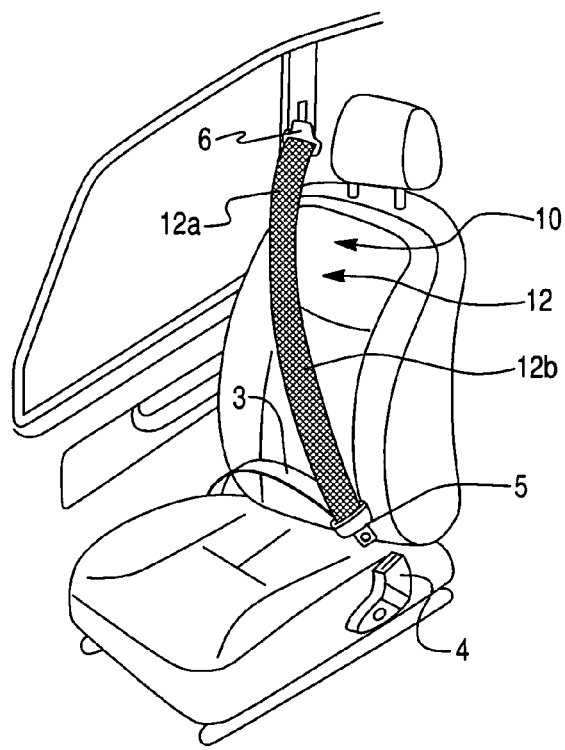
FIG. 3(a) is a perspective view of a seat on which an air belt apparatus according to an embodiment of the present invention is installed and FIG. 3(b) is a perspective view of the air belt apparatus according to an embodiment of the present invention.
Figure 3B:
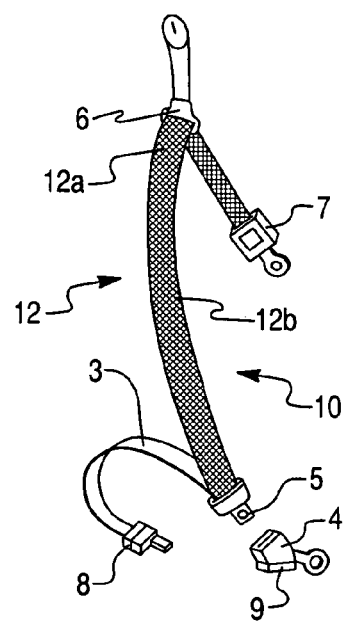

FIG. 3(a) is a perspective view of an interior of a vehicle in which an air belt apparatus according to one embodiment of the present invention is installed and FIG. 3(b) is a perspective view of the air belt apparatus. As illustrated in FIGS. 3(a) and (b), the air bag apparatus 10 includes a shoulder belt 12. The shoulder belt 12 includes a webbing 12a and an air belt 12b. The air belt 12b includes an inflatable member 11 (shown in FIGS. 5(a) and (b)) which is folded and covered with a cover. The air belt 12b is arranged along an occupant, who is sitting on a seat, extending from a breast to belly of the occupant so as to face the occupant. An end of the inflatable member 11, as well as an end of the shoulder belt 12, is connected to the tongue 5.

The inflatable member 11 is folded along crease lines extending in the longitudinal direction of the air belt 12b at the required number of times so as to become a slender folded structure having approximately the same width as that of the inflating air belt 12b. By way of example only, and not a limitation, the inflatable member 11 is folded in a band configuration. Alternatively, and not a limitation, the inflatable member 11 is folded in an accordion configuration.

The non-inflating webbing 12a of the shoulder belt 12 is inserted into the through-anchor 6 and is connected to the retractor 7 so as to enable to be wound up around and pulled out of the retractor 7.

According to one embodiment of the present invention, the air belt apparatus 10 configured as above is installed in a vehicle by inserting the non-inflating webbing 12a of the shoulder belt 12 through the through-anchor 6. The non-inflating webbing 12a, just like the conventional webbing, smoothly slides relative to the through-anchor 6 while being smoothly wound around or pulled out of the retractor 7.

In the air belt apparatus 10 according to one embodiment of the present invention, when the gas generator 9 is operated in the state that the tongue 5 is mounted on the buckle device 4, as shown in FIG. 3(b), the inflatable member 11 within the air belt 12b is inflated. At this time, the longitudinal length of the shoulder belt 12 is reduced so that the air belt 12b sticks to an occupant, enabling the occupant to be very securely protected. That is, as described above, the shoulder belt 12 hardly extends in the longitudinal direction due to the thermo-stretching. When the inflatable member 11 is inflated, the stitching of the shoulder belt 12 is laterally expanded, resulting in reduction in the longitudinal length of the shoulder belt 12 so as to reduce the longitudinal length of the air belt 12b.

According to an embodiment of the present invention as described above, the air belt 12b passes through the anchor 6. However, when the retractor 7 is arranged within a pillar or a seat back, the air belt 12b is inserted through an air belt insertion hole arranged in the upper part of the pillar or the seat back.

Figure 4:
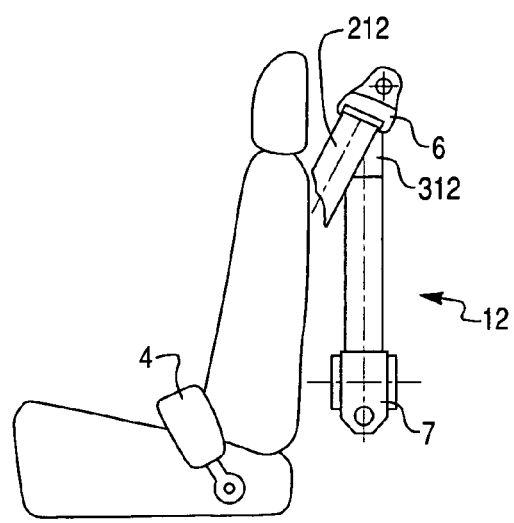
FIG. 4 is a side view of the shoulder belt with the webbing completely retracted according to an embodiment of the present invention.

FIG. 4 is a side view of the shoulder belt 12 with the webbing 12a completely retracted according to an embodiment of the present invention. As illustrated in FIG. 4, the air belt 12b includes a first cover member 212 and a second cover member 312. When the shoulder belt is not in use, the through-anchor 6 is positioned between first cover member 212 and second cover member 312. In such a position, the webbing 12a of shoulder belt 12 is completely in a retracted state.

Figure 5A:
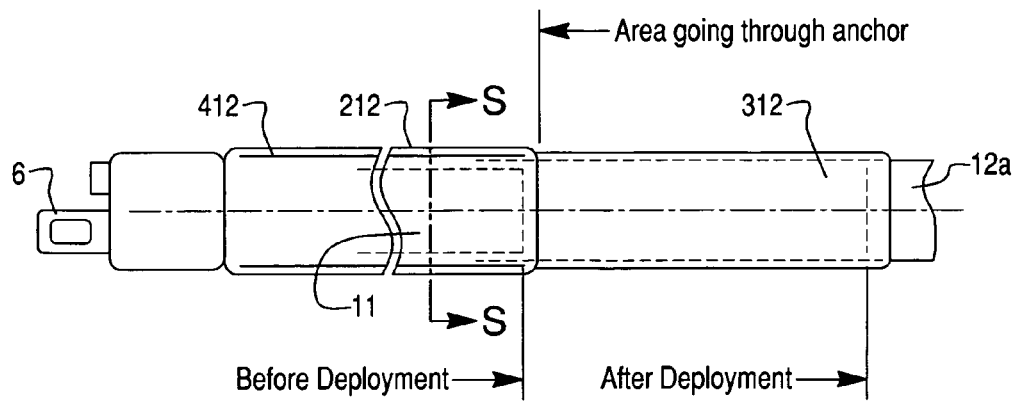
FIGS. 5(a) and 5(b) are structural views of the shoulder belt in a non-inflated state and FIG. 5(c) is a cross-sectional view of the air belt according to an embodiment of the present invention.
Figure 5B:
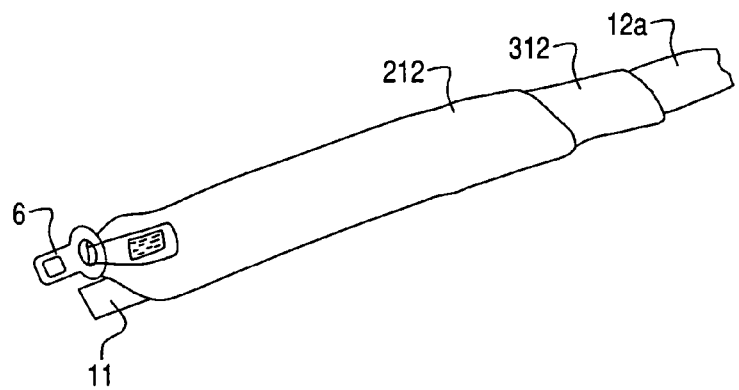
Figure 5C:
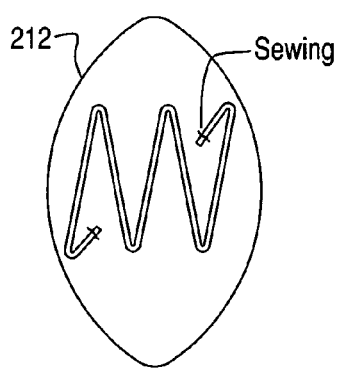

FIGS. 5(a) and 5(b) are structural views of the shoulder belt 12 in an non-inflated state and FIG. 5(c) is a cross-sectional view of the air belt 12b taken along the line S-S in FIG. 5(a) according to an embodiment of the present invention. As stated above, the air belt 12b includes first cover member 212 and second cover member 312. By way of example only, first cover member 212 and second cover member 312 may each include a mesh webbing for enclosing an inflatable member 11. The mesh webbing is flexibly expandable widthwise but can hardly stretch in the direction of the length. As illustrated in FIG. 5(a), first cover member 212 may be connect to the second cover member 312 by a fastening technique such a sewing. As best illustrated in FIG. 5(c), the first cover member 212 and the second cover member 312 each may define an interior cavity wherein the inflatable member 11 may be provided.

As illustrated in FIG. 4, it is contemplated that first cover member 212 is on one side of through-anchor 6 and second cover member 312 is on the other side of through-anchor 6. In this state, the inflatable member 11 may be disposed, or at least partially disposed, within the interior cavity of the first cover member 212. Referring back to FIG. 5(c), inflatable member 11 is folded in an envelope or accordion configuration with the sewn edges folded inward. Besides sewing, the edges of inflatable member 11 may be attached by crimping, clamping, or a various other types of fastening devices or techniques.

According to an embodiment of the present invention, folding the edges of the inflatable member 11 inward allows the air belt 12b to be smooth in appearance and to the touch. Also, this technique reduces the overall length of the air belt 12b. Another advantage of having the sewn edges folded inward is to allow the air belt 12b to easily pass through the through-anchor 6. In an inflated state, the inflated member 11 may extend through to the second cover member 312.

The inflatable member 11 may be constructed using materials, fabrics, and techniques known to those skilled in the art for the construction of airbags. For instance, the inflatable member 11 may be made from a porous material allowing for rapid deflation following inflation. Also, various types of folds beside the band or accordion fold may be used to position the inflatable member 11 within the interior cavity of the first cover member 212 and the second cover member 312. Each type of fold may result in a different type of deployment.

The shoulder belt 12 may also include tear seams 412 provided on the outside of first cover member 212 as illustrated in FIG. 5(a). These tear seams 412 are provided such that they rupture upon inflation of the inflatable member 11 disposed within the interior cavity of the first cover member 212. In an alternative embodiment, tear seams 412 may be extended partially or completely on second cover member 312. The tear seams 412 may involve sewing, crimping, clamping, or various other types of fastening devices or techniques. The strength of the tear seams 412 may vary depending on the fastening technique used. The tear seams 412, when broken, enable the inflatable member 11 to properly expand and provide protection to an occupant of a vehicle.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air belt apparatus, comprising:
   a shoulder belt including a webbing portion, wherein the webbing portion includes an interior cavity;
   an inflatable member stored in the interior cavity; wherein the inflatable member includes sewn edges;
   a first cover member overlying the webbing portion, wherein the inflatable member is folded with the sewn edges facing inward away from the first cover member; and
   a second cover member overlying the webbing portion;
   wherein the shoulder belt is configured so that the first and second cover members are positioned on opposite sides of a through-anchor when the shoulder belt webbing is fully retracted.

2. The apparatus of claim 1, wherein the webbing portion is connected to a tongue.

3. The apparatus of claim 1, further comprising a gas generator for supplying gas into the inflatable member.

4. The apparatus according to claim 1, wherein the first cover member and the second cover member comprise a mesh webbing.

5. The apparatus according to claim 1, wherein the shoulder belt is configured so that when the inflatable member is inflated, the inflatable member extends to a position within the second cover member.

6. The air belt apparatus according to claim 1, further comprising tear seams provided on the first cover member that rupture when the inflatable member is inflated.

7. The apparatus according to claim 1, wherein the inflatable member is folded along crease lines.

8. The apparatus according to claim 1, wherein the webbing is connected to a retractor.

9. An air belt device, comprising:
   a first cover member and a second cover member connected together to cover a shoulder belt, wherein the first cover member and second cover member are arranged end to end of one another in an axial direction of the shoulder belt;
   wherein the shoulder belt includes an interior cavity; and
   wherein an inflatable member is at least partially disposed within the interior cavity along a length covered by the first cover member when the inflatable members is in an uninflated state;
   wherein the inflatable member is folded within the interior cavity and includes sewn edge portions that are folded inward away from the surface of the interior cavity.

10. The air belt device according to claim 9, wherein the first and second cover members are flexibly expandable in a widthwise direction.

11. The air belt device according to claim 9, wherein the first cover member includes tear seams that are configured to rupture when the inflatable member inflates.

12. The air belt device according to claim 9, wherein the inflatable member is folded into a band configuration.

13. The air belt device according to claim 9, wherein the inflatable member is folded in an accordion configuration.

* * * * *